US010417872B2

(12) United States Patent
Heathcote et al.

(10) Patent No.: US 10,417,872 B2
(45) Date of Patent: Sep. 17, 2019

(54) GAME SYSTEM AND METHOD BASED ON EXTERNAL EVENT OUTCOMES

(71) Applicant: IGT Global Solutions Corporation, Providence, RI (US)

(72) Inventors: Bradford Heathcote, Chepachet, RI (US); Aaron Michael Koll, Lincoln, CA (US); Francesco Parola, Providence, RI (US); Sarah W. Simpkins, Warwick, RI (US)

(73) Assignee: IGT, Las Vegas, NV (US)

( * ) Notice: Subject to any disclaimer, the term of this patent is extended or adjusted under 35 U.S.C. 154(b) by 85 days.

(21) Appl. No.: 15/429,316

(22) Filed: Feb. 10, 2017

(65) Prior Publication Data

US 2017/0236364 A1 Aug. 17, 2017

Related U.S. Application Data

(60) Provisional application No. 62/293,918, filed on Feb. 11, 2016.

(51) Int. Cl.
*A63F 13/00* (2014.01)
*G07F 17/32* (2006.01)

(52) U.S. Cl.
CPC ........ *G07F 17/329* (2013.01); *G07F 17/3227* (2013.01)

(58) Field of Classification Search
CPC ......................... G07F 17/3288; G07F 17/3276
See application file for complete search history.

(56) References Cited

U.S. PATENT DOCUMENTS

| | | | |
|---|---|---|---|
| 6,024,641 | A | 2/2000 | Sarno |
| 6,102,797 | A | 8/2000 | Kail |
| 6,309,307 | B1 | 10/2001 | Krause et al. |
| 6,656,042 | B2 | 12/2003 | Reiss et al. |
| 7,485,037 | B2 | 2/2009 | Penrice |
| 7,548,242 | B1 | 6/2009 | Hughes et al. |
| 7,641,549 | B2 | 1/2010 | Asher et al. |
| 7,674,170 | B2 | 3/2010 | Odom et al. |
| 7,887,406 | B2 | 2/2011 | Odom et al. |
| 8,182,328 | B2 | 5/2012 | Odom et al. |
| 8,246,432 | B2 | 8/2012 | Lutnick et al. |
| 8,292,725 | B2 | 10/2012 | Wikander |

(Continued)

*Primary Examiner* — David L Lewis
*Assistant Examiner* — Eric M Thomas
(74) *Attorney, Agent, or Firm* — Neal, Gerber & Eisenberg LLP

(57) ABSTRACT

Embodiments of a game system and method employ the outcomes of external real-life events in determining winners. Generally, in various embodiments, the game system selects a group of performers for presenting in a game play area of an issued ticket, determines a performance score for each performer based on each performer's real-life performance in an upcoming event, and compares the performance score with the scores other performers in order to determine whether the ticket has zero, one or more winners. In embodiments, the game system can monitor performer status between the time of ticket issuance and the time of performance, and can replace any originally selected performers who become unavailable with a replacement performer. The game system and method of the present disclosure thus ensure that issued tickets maintain a full complement of chances based on external event outcomes.

20 Claims, 7 Drawing Sheets

(56) References Cited

U.S. PATENT DOCUMENTS

| | | | | |
|---|---|---|---|---|
| 8,535,134 | B2 | 9/2013 | Katz et al. | |
| 8,574,055 | B2 | 11/2013 | Odom et al. | |
| 8,579,694 | B2 | 11/2013 | Odom et al. | |
| 8,690,657 | B2 | 4/2014 | D'Angelo | |
| 8,708,795 | B2 | 4/2014 | Napolitano | |
| 8,715,056 | B2 | 5/2014 | Kumbhat et al. | |
| 8,727,349 | B2 | 5/2014 | Hodges et al. | |
| 8,944,905 | B2 | 2/2015 | Odom et al. | |
| 9,202,332 | B2 | 12/2015 | Bahou | |
| 2002/0187825 | A1* | 12/2002 | Tracy | G07F 17/32 463/17 |
| 2003/0060262 | A1 | 3/2003 | Yeend | |
| 2003/0162581 | A1 | 8/2003 | Dawson | |
| 2003/0209853 | A1 | 11/2003 | Harris | |
| 2003/0224847 | A1 | 12/2003 | Jaimet | |
| 2005/0239538 | A1 | 10/2005 | Dixon | |
| 2009/0011813 | A1 | 1/2009 | Saffron | |
| 2010/0069137 | A1 | 3/2010 | D'Angelo | |
| 2012/0009984 | A1* | 1/2012 | Amaitis | G07F 17/3244 463/4 |
| 2013/0079073 | A1* | 3/2013 | Sharifi | A63F 13/10 463/3 |
| 2013/0273994 | A1 | 10/2013 | Cobb et al. | |
| 2014/0094274 | A1 | 4/2014 | Guinn et al. | |
| 2014/0148238 | A1 | 5/2014 | D'Angelo | |
| 2014/0364188 | A1 | 12/2014 | Napolitano | |
| 2014/0370966 | A1 | 12/2014 | Bahou | |
| 2015/0105134 | A1 | 4/2015 | Cobb et al. | |
| 2015/0105135 | A1 | 4/2015 | Cobb et al. | |
| 2015/0294527 | A1 | 10/2015 | Kolomiiets | |
| 2015/0325085 | A1 | 11/2015 | O'Hagan | |

* cited by examiner

Fig. 2

80

| **Football** | **Basketball** | **Hockey** | **Baseball** |
|---|---|---|---|
| Quarterback | Guard | Goaltender | Catcher |
| Tight End | Guard | Defensive | Pitcher |
| Wide Receiver | Forward | Right Wing | 1/3 Infielder |
| Running Back | Forward | Center | 2/SS Infielder |
| Kicker | Center | Left Wing | Outfielder |

81 82 83 84

35
33
10
58
External Systems
Local System
40
Network
75
49
Remote Host
Games
Available Performers
Replacement Performers
Purchased Tickets
71
72
73
74

GAME SYSTEM AND METHOD BASED ON EXTERNAL EVENT OUTCOMES

PRIORITY CLAIM

This application claims the benefit of and priority to U.S. Provisional Patent Application No. 62/293,918, filed on Feb. 11, 2016, the contents of which are incorporated herein.

BACKGROUND

The present invention relates to game systems and methods, and more particularly to a game system and method employing external event outcomes.

Lottery games that are determined by pre-printed indicia and random drawings are known. For example, instant lottery tickets typically provide a scratch-off coating whereby a user can scratch off the coating to determine if the underlying indicia result in any winnings. Online or draw-based games allow a user to select various indicia such as numbers, or have the numbers randomly selected for the user, and then a random drawing determines if the user's indicia match enough of the randomly drawn indicia for the user to win.

Grid-based wagering games, such as Bingo or Crossword games, for example, permit players to spend more time on a game before knowing whether or not the game has been won. Some extended play games also provide for second chances or bonus plays based on a single wager.

Presently, ticket-based games do not address technical challenges associated with incorporating external event outcomes, such as sports fantasy-themed games involving real-life statistics that are not determined until after a ticket is issued. For example, incorporating real-life statistics in a sports fantasy-themed game may require ongoing status monitoring of available performers and replacements for unavailable performers, so that previously issued tickets maintain a full complement of chances based on external event outcomes.

In addition, current games do not involve tickets having game play information that is modifiable after the time the ticket is issued based on external events.

BRIEF SUMMARY

Aspects of the present invention pertain to a game system and method involving a host computer that selects or randomly determines a subset of available performers from a pool of such performers. The performers can be real-world performers whose performances can be statistically tracked according to established metrics, such as in fantasy sports, for example.

In various embodiments of the present invention, the subsets of performers are printed onto a physical ticket, or presented on a virtual ticket, of a user that purchases the ticket. The printed data can include a name, photo, image or other identifying data for each performer in the subset. Outcomes of one or more external events determine how well each performer performed according to underlying measured statistics. The host can either track the underlying statistics directly, or receive such data from an external source. The user (e.g., the holder of the ticket) wins or loses as a result of the performance of each of the subset of performers on the user's ticket. In these ways, the value or winning status of the issued ticket is not pre-determined, and is further not determined by player skill, but rather depends on external event outcomes.

The game can be played with a physical ticket, or with a virtual ticket accessible via computing device, including mobile devices. In various embodiments, the randomly selected available performers may pertain to the same activity (e.g., a specific sport), but hold different positions within the sport. Different subsets of performers are issued to individual tickets as ticket order requests are received, and stored in a database of purchased tickets.

In various embodiments, each performer's role or position can be judged according to one or more statistical metrics. At the end of a given time period and after the ticket is issued, the highest scoring performer for each position in the pool of available performers is determined by the host, the results are made available to each ticket holder and winnings are determined.

In various embodiments, a pool of replacement performers is maintained, and a status of the available performers is tracked, such that if an available performer in the pool of available performers and/or selected for any tickets becomes unavailable after a ticket is issued, the host selects a replacement performer, substitutes the selected replacement performer for the now-unavailable performer for all tickets that originally included the now-unavailable performer, and stores the new grouping of performers in the purchased ticket database so that all tickets that originally included the now-unavailable performer maintain a full complement of participating performers. In various embodiments, the pool of replacement performers corresponds to backup players for each of the positions and teams associated with the available performers in the pool of available performers. The host then determines a score for any selected replacement performers when the highest scoring performer is later determined.

In various embodiments, additional prizes can be awarded over extended time periods. For example, if a given performer on a ticket is the top performer for a given position for a full season, the ticket holder bearing that performer may win a prize.

BRIEF DESCRIPTION OF THE SEVERAL VIEWS OF THE DRAWINGS

FIG. 2 is a chart illustrating various positions within exemplary sports in accordance with the present disclosure.

DETAILED DESCRIPTION

One example embodiment of the present disclosure includes a ticket or group of tickets for play of a fantasy-sports themed wagering game based on external event outcomes, where one or more customers are provided with one or more tickets. Each ticket includes one or more game play areas. A first subset of the tickets exists where each ticket in the first set includes game play information indicating that the ticket is a winner based on the real-life performance of multiple performers identified on the ticket. A second subset of the tickets exists where each ticket in the second set includes game play information indicating that the ticket is a winner based on the real-life performance of a single performer identified on the ticket, but not based on multiple performers. A third subset of the tickets exists where each ticket in the third set includes game play information indicating that the ticket is not a winner. A fourth subset of the tickets exists where each ticket in the fourth set does not include game play information indicating that the ticket is a winner based on the real-life performance of any performer identified on the ticket, but is nonetheless a winner based on the real-life performance of a replacement performer associated with the ticket in a database of purchased tickets, as described elsewhere herein.

Figure 1:
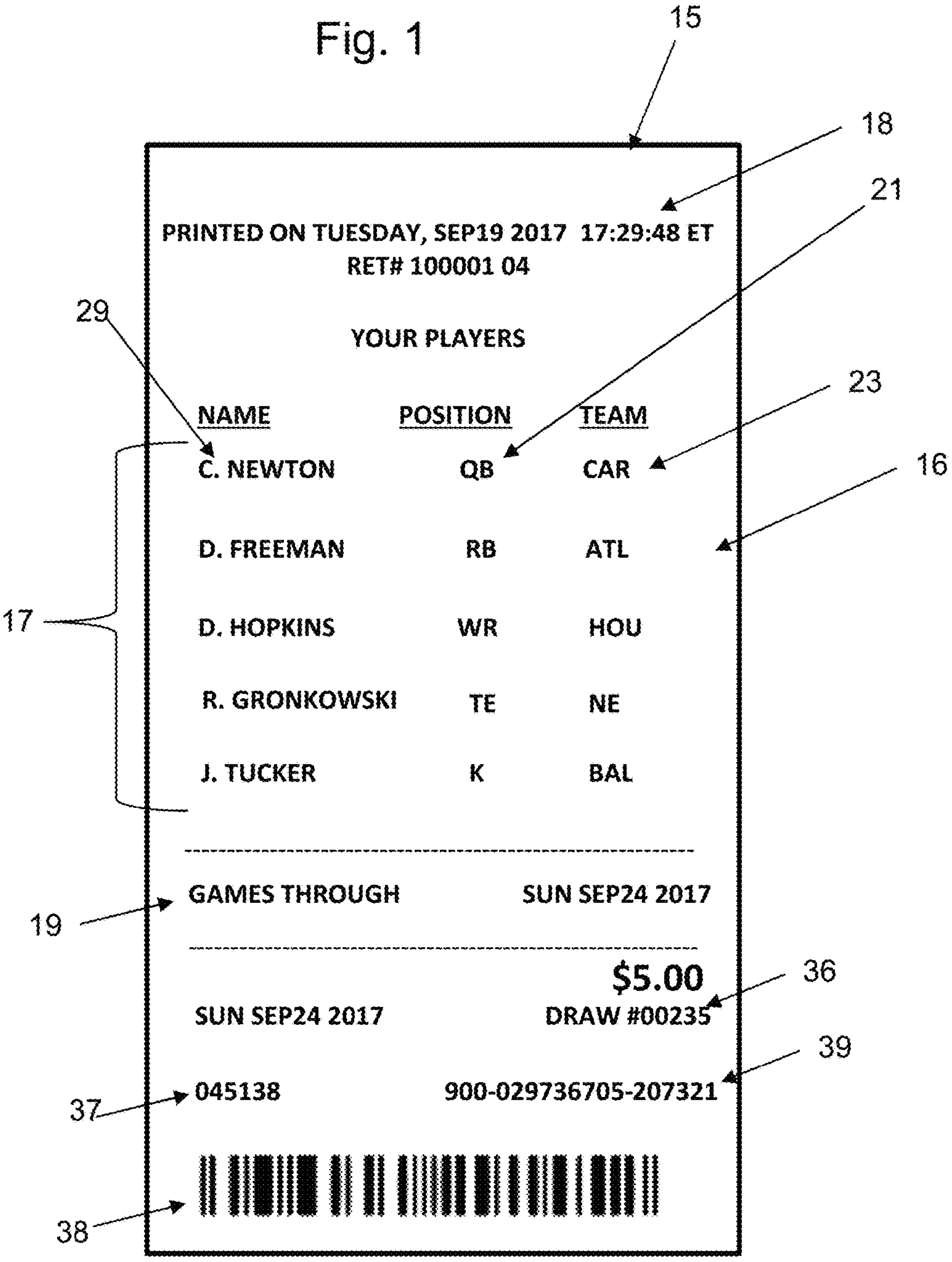
FIG. 1 is an example embodiment of an issued ticket in accordance with the present disclosure.

A sample ticket 15 illustrating identification information 17 for five performers in a game play area 16, a time of entry reference 18 and an external event date reference 19 is shown in FIG. 1. The identification information 17 for each performer can include a performer name 29, position 21 and team identifier 23, for example. In the sample ticket 15 of FIG. 1, five players from the National Football League™ are illustrated, and each player is associated with a distinct position. In various embodiments, each ticket shows performers for a plurality of positions, with no two positions being the same and no performer being associated with more than one position. For example, the chart 80 of FIG. 2 shows available performer positions for different sports. As a specific example, a football-themed game as indicated generally at 81 may populate the subset of performers for the game play area with a quarterback, a tight end, a wide receiver, a running back and a kicker. Alternatively, another game, such as the basketball-themed game indicated generally at 82, can populate the subset of performers with two guards, two forwards and a center. As such, the basketball-themed game includes multiple performers playing the same position on a given ticket. A hockey-themed game can populate the subset of performers with a goaltender, a defenseman, a right wing, a left wing and a center, as indicated generally at 83. A baseball-themed game, as indicated generally at 84, can populate the subset of performers with a catcher, a pitcher, a first- or third-baseman, a shortstop or second baseman and an outfielder. Other combinations of players can be employed and other sports can be used. Further, non-sports games can be provided, such as a weather-themed game involving the weather in multiple geographic areas, or a stock market-themed game, including stock ticker symbols from different industry groups, for example.

Figure 3:
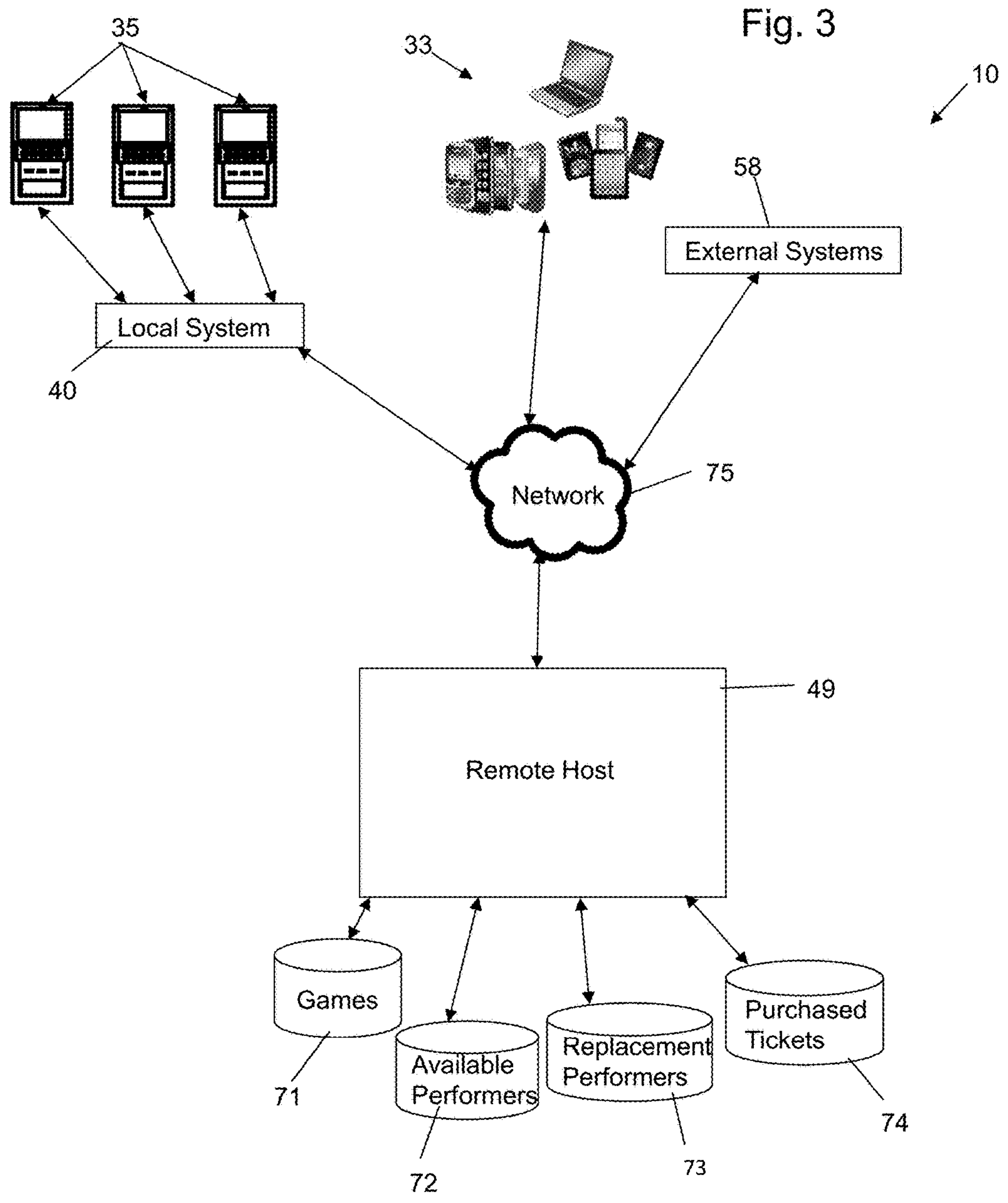
FIG. 3 is a schematic block diagram of one embodiment of a network configuration of the game system of the present disclosure.

In various embodiments, the game system 10 can operate with one or more vending units 35 and/or personal computing devices 33 in networked connection with a central host computer system 49, as shown in FIG. 3 and described elsewhere herein. The central host computer system 49 can provide instructions to the one or more vending units 35 and/or computing devices 33 as these devices carry out their designed functions. As shown in FIG. 3, it will be appreciated that system 10 can be deployed with direct connections from central host 49 to a user device 33 via data network 75, or indirect connection through a local computing system 40. It will be appreciated that there may be a plurality of vending units 35 in an establishment which are configured to process payments and issue tickets to players, as well as to receive tickets for redemption. Optionally, the vending units (e.g., 35) may be self-serve automated terminals or may be staffed by an agent. The user computing devices 33 may be, for example, mobile communication devices, PDAs, notebook computers, tablets or personal computers. The player may use the user device 33 as a form of terminal to purchase game tickets. Further, the user may use a device 33 to generate a ticket request for sending to the host, obtain a code from the host representing the requested ticket, bring the code to a vending unit 35, and receive a ticket after the code is scanned by the vending unit 35. Since the clerk-attended terminal or self-serve terminal 35 may be loaded with printed tickets or have a proprietary printing system, the user device 33 may differ in this respect, and may be limited to virtual tickets or printing of tickets with an available printer, for example. The vending units 35 may also redeem the tickets for cash prizes, which can be issued directly to the player redeeming the ticket or credited to a player account associated with the redeemed ticket. Virtual tickets can be redeemed via the host crediting a player account associated with the redeemed ticket, for example.

It should be appreciated that the embodiments of the present disclosure described herein can be implemented in accordance with or in conjunction with one or more of a variety of different types of game systems, each having one or more of a plurality of different features, attributes, or characteristics. It should be appreciated that a "game system" as used herein refers to various configurations of: (a) one or more central servers, central controllers, or remote hosts, such as host 49 in FIG. 3; (b) one or more vending units, such as units 35 in FIG. 3; and/or (c) one or more personal gaming devices, such as desktop computers, laptop computers, tablet computers or computing devices, personal digital assistants (PDAs), mobile telephones such as smart phones, and other mobile computing devices, as illustrated at 33 in FIG. 3.

Thus, in various embodiments, the game system of the present disclosure can include: (a) one or more vending units in combination with one or more central servers, central controllers, or remote hosts; (b) one or more personal gaming devices in combination with one or more central servers, central controllers, or remote hosts; (c) one or more personal gaming devices in combination with one or more vending units; (d) one or more personal gaming devices, one or more vending units, and one or more central servers, central controllers, or remote hosts in combination with one another; (e) a single vending unit; (f) a plurality of vending units in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each vending unit and each personal gaming device of the present disclosure can be referred to herein as a "gaming device." Additionally, for brevity and clarity, unless specifically stated otherwise, "gaming device" as used herein represents one gaming device or a plurality of gaming devices, and "central server, central controller, or remote host" as used herein represents one central server, central controller, or remote host or a plurality of central servers, central controllers, or remote hosts.

In various embodiments, the game system includes a gaming device in combination with a central server, central controller, or remote host. In such embodiments, the gaming device is configured to communicate with the central server, central controller, or remote host through a data network or remote communication link. In certain such embodiments, the gaming device is configured to communicate with another gaming device through the same data network or remote communication link or through a different data network or remote communication link. For example, the game system illustrated in FIG. 3 includes a plurality of gaming devices 33, 35 that are each configured to communicate with a central server, central controller, or remote host 49 through a data network 75.

In certain embodiments in which the game system includes a central server, central controller, or remote host, the central server, central controller, or remote host is any suitable computing device (such as a server) that includes at least one processor and at least one memory device or storage device. FIG. 3 illustrates four storage devices, including a games database 71, an available performer database 72, a replacement performer database 73 and a purchased tickets database 74. As further described below, the gaming device includes at least one gaming device processor configured to transmit and receive data or signals representing events, messages, commands, or any other suitable information between the gaming device and the central server, central controller, or remote host. The at least one processor of such a gaming device is configured to execute the events, messages, or commands represented by such data or signals in conjunction with the operation of the gaming device. Moreover, the at least one processor of the central server, central controller, or remote host is configured to transmit and receive data or signals representing events, messages, commands, or any other suitable information between the central server, central controller, or remote host and the gaming device. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the gaming device. It should be further appreciated that one, more, or each of the functions of the at least one processor of the gaming device may be performed by the at least one processor of the central server, central controller, or remote host.

In certain embodiments, computerized instructions for controlling any games or game content displayed by the gaming device are executed by the central server, central controller, or remote host. In such "thin client" embodiments, the central server, central controller, or remote host remotely controls any games or game content (or other suitable interfaces) displayed by the gaming device, and the gaming device is used to display such games or game content (or suitable interfaces) and to receive one or more inputs or commands. In other embodiments, computerized instructions for controlling any games or game content displayed by the gaming device are communicated from the central server, central controller, or remote host to the gaming device and are stored in at least one memory device of the gaming device. In such "thick client" embodiments, the at least one processor of the gaming device executes the computerized instructions to control any games or game content (or other suitable interfaces) displayed by the gaming device.

In various embodiments in which the game system includes a plurality of gaming devices, one or more of the gaming devices are thin client gaming devices and one or more of the gaming devices are thick client gaming devices. In other embodiments in which the game system includes one or more gaming devices, certain functions of one or more of the gaming devices are implemented in a thin client environment, and certain other functions of one or more of the gaming devices are implemented in a thick client environment. In one such embodiment in which the game system includes a gaming device and a central server, central controller, or remote host, computerized instructions for controlling any primary or base games displayed by the gaming device are communicated from the central server, central controller, or remote host to the gaming device in a thick client configuration, and computerized instructions for controlling any functions displayed by the gaming device are executed by the central server, central controller, or remote host in a thin client configuration.

In certain embodiments in which the game system includes: (a) a gaming device configured to communicate with a central server, central controller, or remote host through a data network; and/or (b) a plurality of gaming devices configured to communicate with one another through a data network, the data network is a local area network (LAN) in which the gaming devices are located substantially proximate to one another and/or the central server, central controller, or remote host. In one example, the gaming devices and the central server, central controller, or remote host are located in a gaming establishment or a portion of a gaming establishment.

In other embodiments in which the game system includes: (a) a gaming device configured to communicate with a central server, central controller, or remote host through a data network; and/or (b) a plurality of gaming devices configured to communicate with one another through a data network, the data network is a wide area network (WAN) in which one or more of the gaming devices are not necessarily located substantially proximate to another one of the gaming devices and/or the central server, central controller, or remote host. For example, one or more of the gaming devices are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the gaming devices are located. It should be appreciated that in certain embodiments in which the data network is a WAN, the game system includes a central server, central controller, or remote host and a gaming device each located in a different gaming establishment in a same geographic area, such as the same city or the same state. It should be appreciated that game systems in which the data network is a WAN are substantially identical to game systems in which the data network is a LAN, though the quantity of gaming devices in such gaming systems may vary relative to one another.

In further embodiments in which the game system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers and/or ticket requests associated with the present disclosure, and displays those requested wagers and/or ticket requests via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In various embodiments, a gaming device includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). The at least one processor of the gaming device is configured to communicate with, configured to access, and configured to exchange signals with the at least one memory device or data storage device. In various embodiments, the at least one memory device of the gaming device includes random access memory (RAM), which can include non-volatile RAM (NVRAM), magnetic RAM (MRAM), ferroelectric RAM (FeRAM), and other forms as commonly understood. In other embodiments, the at least one memory device includes read only memory (ROM). In certain embodiments, the at least one memory device of the gaming device includes flash memory and/or EEPROM (electrically erasable programmable read only memory). It should be appreciated that any other suitable magnetic, optical, and/or semiconductor memory may operate in conjunction with the gaming devices disclosed herein.

In various embodiments, the gaming device includes one or more input devices. The input devices may include any suitable device that enables an input signal to be produced and received by the at least one processor of the gaming device. One input device of the gaming device is a payment device configured to communicate with the at least one processor of the gaming device to fund the gaming device. In certain embodiments, the payment device includes one or more of: (a) a bill acceptor into which paper money is inserted to fund the gaming device; (b) a ticket acceptor into which a ticket or a voucher is inserted to fund the gaming device; (c) a coin slot into which coins or tokens are inserted to fund the gaming device; (d) a reader or a validator for credit cards, debit cards, or credit slips into which a credit card, debit card, or credit slip is inserted to fund the gaming device; (e) a player identification card reader into which a player identification card is inserted to fund the gaming device; or (f) any suitable combination thereof.

In certain embodiments, one input device of the gaming device is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video and/or display controller. In these embodiments, signals are input to the gaming device by touching the touch screen at the appropriate locations.

The at least one memory device of the host can store operating data, such as image data, event data, input data, random number generators (RNGs) or pseudo-RNGs, paytable data or information, and/or applicable game rules that relate to the play of one or more games as described herein. Such data and/or programming can be stored, for example, in the games database 71 according to various embodiments of the present disclosure.

As referenced above, the host 49 can operate in connection with various databases (e.g., 71, 72, 73 and/or 74) for facilitating operation of the game system 10 described herein. For instance, the host can establish a pool of available real-life performers, wherein the pool of available real-life performers includes identification information for a number of available real-life performers. As noted above, the identification information can include, for example, the performer's name, position and team identifier. The host can also establish a pool of replacement real-life performers, wherein this separate pool includes identification information for a number of replacement real-life performers. In various embodiments, the replacement players may or may not be employed for a given game or winning ticket determination, and can generally be deemed to be replacements or "backups" for the "starters" who are stored as available real-life performers. Whenever a game ticket request is made, such as by a user of a gaming device (e.g., 33 or 35), the host receives the request, and generates a subset of the available real-life performers to be used as game play information for the requested ticket. The generated subset can be randomly generated, or can be specifically selected by the user or the host. In the event of random selection, the user may be provided with an option to accept the initially randomly selected subset of performers, or have the host re-select another subset of performers. For example, if the user does not wish to complete the purchase of the ticket based on the originally generated subset of performers, the user can request that the host generate a subset that is different from the originally generated subset as many times as desired in order to receive a subset that is acceptable for purchase. In various embodiments, the host randomly selects one performer per position from the pool of available real-life performers for each ticket. The number of available performer positions can differ from sport to sport. The tickets can be issued as a physical ticket, which may be printed by a gaming device (e.g., vending devices 35), or as a virtual ticket accessible via another gaming device (e.g., devices 33).

The issued ticket(s) include game play information including multiple real-life performers randomly selected from the pool of available real-life performers, as indicated at 17 in FIG. 1. The identification information associated with each real-life performer is shown in FIG. 1, including the performer's name 29, position 21 and team identifier 23. The team identifier may be a geographic name as opposed to a team nickname, for example. In the embodiment shown in FIG. 1, five different performers are shown with mutually exclusive positions. It will be appreciated that it is possible for different tickets to share the same player and/or full set of players. As further shown in FIG. 1 and described above, the issued ticket 15 includes a time of entry reference 18 indicating when the ticket was purchased, issued and/or printed, a drawing reference number 36, a ticket number 37, a barcode or other type of human non-readable code 38 and a human readable code 39. Each of elements 18, 36, 37, 38 and 39 provides a way of uniquely identifying and/or referencing the specific ticket issued by the host for later validation purposes when the ticket is presented for redemption, for example, and can be stored by the host in a database 74 of purchased tickets, along with an external event date reference 19 indicating a date by which real-life games are to be played by the performers on the issued ticket(s), the performers in the pool of available real-life performers, and/or a subset thereof. It will be appreciated that the barcode and/or serial number may also implement anti-tamper measures, and the ticket may contain additional security measures. The ticket may also have other relevant information such as the agent and/or terminal the ticket was generated on, and a range of validation or security measures to prevent cheating, for example.

In various embodiments, the host can identify one or more real-life games to be played by the external event date reference and after the time of entry reference on the plurality of user tickets. For example, for NFL™ games on any given week, there may be a Thursday night game, many Sunday games and a Monday night game. Thus, if a ticket is purchased and issued on a Tuesday of a typical NFL™ game week, the time reference 18 would indicate Tuesday at a specific time, for example, and the external event date reference 19 would indicate the following Monday as a date by which real-life games are to be played by the performers. In various embodiments, and prior to the external event date, the host can determine whether any of the game play information of each of the user tickets includes at least one performer who is unavailable to participate in the identified one or more real-life games. This may occur, for example, when a performer becomes injured, suspended or otherwise unavailable between the time of ticket purchase and the date reference. Such information can be learned through various external information sources 58 accessible via network 75, for example. In various embodiments, an external system 58 such as a trusted and certified sports data provider (e.g., stats.com) can be employed to verify or update performer status, and to verify or acquire statistical results in determining game outcomes. In such occasion, and for each of the user tickets including at least one performer who is determined to be unavailable to participate in the identified one or more real-life games, the host can select a specific replacement real-life performer from the pool of replacement real-life performers and update the game play information associated with each of the affected user tickets. Such an update can include replacing the performer who is unavailable with the selected replacement performer, and storing the update in the database of purchased tickets. According to various embodiments, the replacement performer is selected to have the same position as the position of the performer being replaced. Further, according to various embodiments, the replacement performer is selected based on having the same team identifier as the team associated with the performer being replaced. Such operation helps ensure that each ticket has a full complement of performers that will actually be expected to perform or participate in the identified games.

Figure 5:
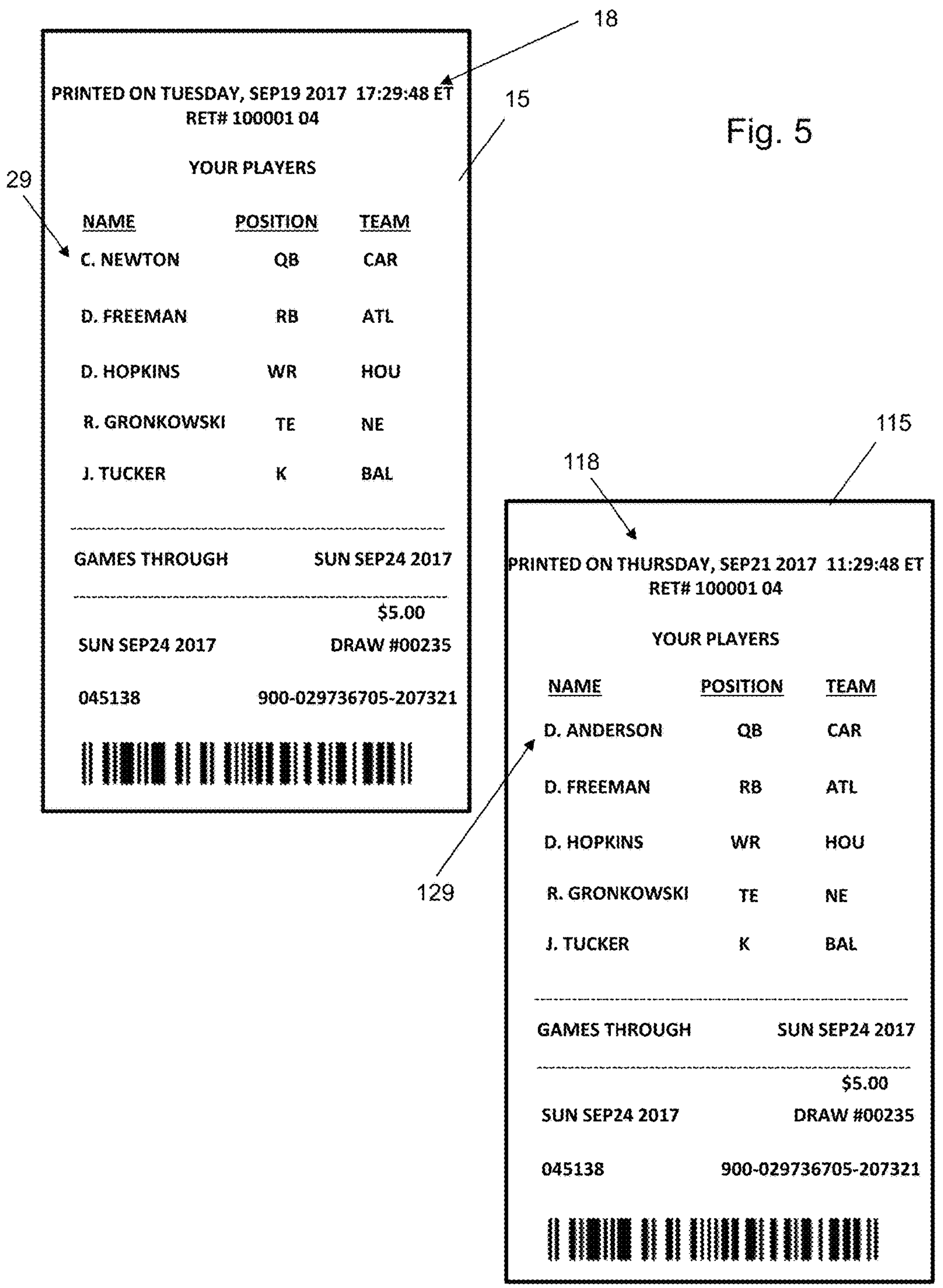
FIG. 5 is an example embodiment of an issued ticket and a replacement ticket in accordance with the present disclosure.

In various embodiments, a replacement ticket can be issued after a replacement performer has been selected to replace one of the originally available real-life performers. Whether a replacement ticket is issued can depend upon the timing of the replacement performer being selected, the form of the original ticket (e.g., physical or virtual) and the availability of the ticket holder to access suitable replacement ticket issuing devices, among other things. For instance, in the embodiments where a virtual ticket has been issued, the host can issue a replacement ticket virtually depicting the updated grouping of players on a visual display of a user gaming device (e.g., 33 in FIG. 3). In the embodiments where a physical ticket has been issued, the host can provide for a replacement physical ticket to be available upon the ticket holder appearing before a gaming device (e.g., vending device 35 in FIG. 3) capable of printing a replacement ticket upon proper authentication being provided. For example, if a ticket holder has an original ticket with five original performers identified, and one of the original performers is replaced as described herein, the ticket holder may be enabled to present the barcode or other identifying information from the ticket to a ticket reader associated with a gaming device as described herein, and have the gaming device communicate with the host to determine that the ticket is one which now includes a replacement performer. At such time, the host can instruct the gaming device to print a replacement ticket showing the five actual performers whose score will be determined for purposes of assessing whether the ticket has won, as described elsewhere herein. FIG. 5 illustrates an original ticket 15 with an original time reference 18, showing five players including Cam Newton, the quarterback of the Carolina Panthers. FIG. 5 also illustrates a replacement ticket 115 with a new time reference 118, showing four of the five players from the original ticket 15, but wherein Cam Newton has been replaced by Derek Anderson, who is the "backup" quarterback for the Carolina Panthers. Such a replacement ticket 115 can be issued, for example, if the system learns that Cam Newton will be unavailable to play in the designated week's games due to injury or some other reason. Regardless of whether a replacement ticket is issued, the ticket will be assessed for a winning status based on the performers stored in the purchased ticket database at the external event date reference (i.e., when the outcome determinative external events occur). Thus, as described above, a subset of issued tickets for a game according to embodiments of the game system may be a winner even though none of the performers listed on the originally issued ticket are determined to have the highest score for their identified position.

Figure 4:
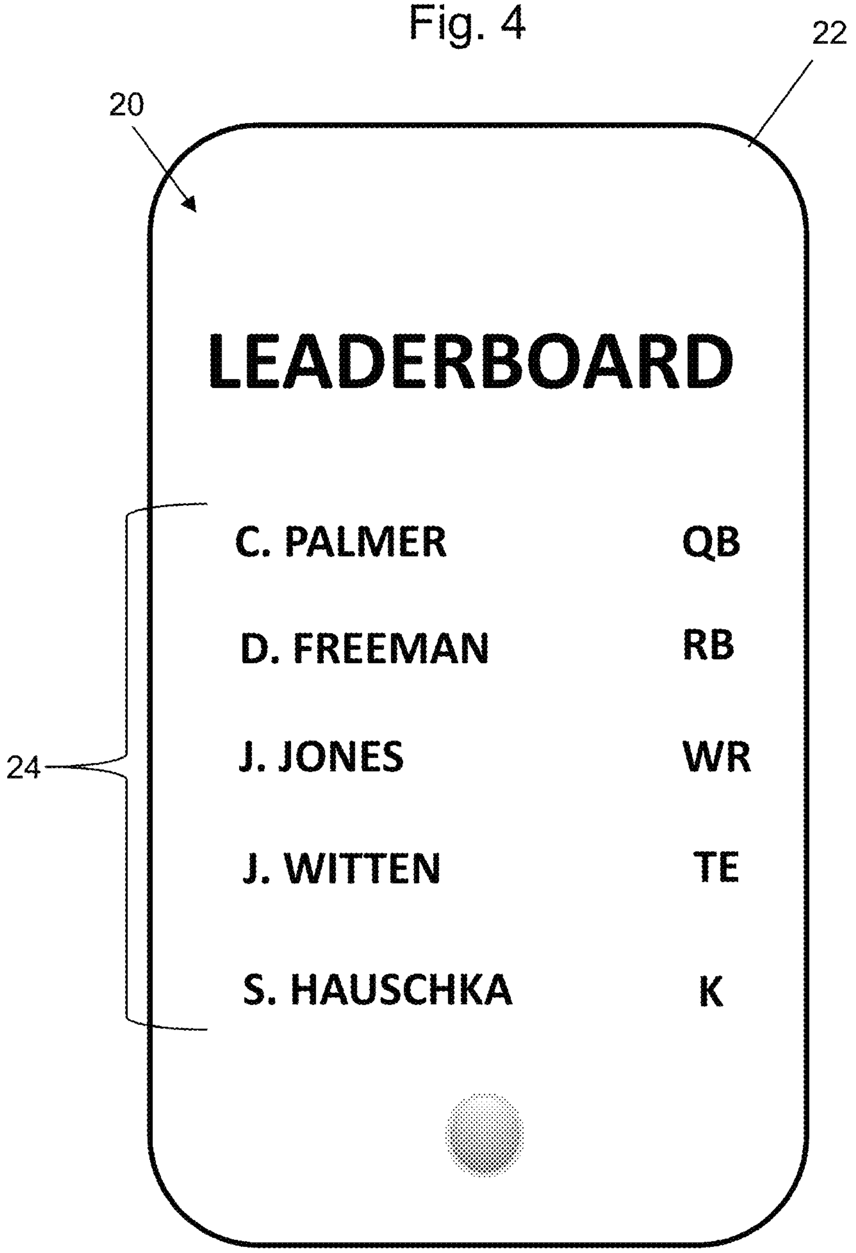
FIG. 4 is a screen shot of one example embodiment of results depicted by the game system of the present disclosure.

Once any replacement performers are selected and stored, and once the external event date reference 19 has arrived and/or passed, the host can operate to receive real-life statistical performance information associated with the performance of the available real-life performers, whether randomly selected for any tickets or not, as well as for the selected specific replacement performers for the games covered by the associated time period. As a specific example, a quarterback for a football team can be tracked according to rushing touchdowns scored, yards thrown, touchdown passes thrown, etc. A baseball player can be tracked according to runs, hits, home runs, runs batted in and other categories. A race horse can be tracked according to whether the horse wins, places or shows. Real-world, non-sports performances can also be tracked, such as the weather, the stock market and other real-world events. Such information can be obtained through online external sources 58, as indicated elsewhere herein. A sample display 20 on a mobile device 22 of the statistical leaders 24 for events associated with the event time reference is shown in FIG. 4. The results can be made available actively such as by pushing a notification to users, or passively such as by displaying the results online or at retail stores, for example.

The host can further determine a fantasy performance score for all of the available performers and the selected replacement performers based upon the received real-life statistical performance information, and can then determine whether each of the tickets is a winner by comparing each performer associated with each ticket with all performers having the same position who participated in the identified games for the given time period, for example. As a specific example, for the ticket 15 of FIG. 1, and using the results displayed on the display 20 in FIG. 4, the user would have one a single time based upon the running back, D. Freeman, accumulating the most points for his position based on the real-life statistical performance information for the given time period. In this way, embodiments of the game system and method can assess whether each ticket has lost, won a single time or won multiple times. In various embodiments, each performer's role or position can be judged according to a single statistical metric or multiple metrics. Prizes can be awarded based on the number of highest scoring performers on a single ticket, for example. For example, total points scored may be used as the metric to evaluate the performance of each football performer. In other embodiments, each position can be judged according to multiple metrics that are converted to a common metric. For example, a quarterback can earn game points by scoring rushing touchdowns or throwing passing touchdowns. If, for example, a quarterback scores one rushing touchdown and throws one passing touchdown, and the game provides for six game points for a rushing touchdown and four game points for a passing touchdown, the quarterback will have earned ten game points. The "game points" are the common metric used to measure the performance of each of the performers during the game.

In various embodiments, the game system and method operate such that replacement players are not employed. In such embodiments, the host receives real-life statistical performance information associated with the performance of all available real-life performers in the games played as of the external event date on the tickets, regardless of whether each real-life performer has been selected for any tickets. The host then determines a fantasy performance score for each of the available real-life performers based upon the received real-life statistical performance information, and determines whether the determined fantasy performance score for each performer on the user ticket exceeds the determined fantasy performance score of all of the available real-life performers having a common position.

In various other embodiments, replacement performers for any performers deemed unavailable after the issuance of a ticket are not specifically identified based upon being from the same team and at the same position, but are randomly selected by the host from a subset of available performers in the pool of available performers having the same position as the player deemed to be unavailable. In still other embodiments, replacement performers are randomly selected by the host from all available performers in the pool of available performers, regardless of team or position.

Among other things as described herein, the game database 71 can store information pertaining to available games for selection, including graphic designs, sports' performer names and positions, non-sports performers, available wager amounts, odds and other game-related elements. In various embodiments, the pool of available performers can be stored in database 72 and can be initially populated with various players/performers who play various positions in various sports. For example, the set of football players included in the games database 71 may include, for example, thirty-two quarterbacks, thirty-two wide receivers, thirty-two running backs, thirty-two tight ends and thirty-two kickers from the National Football League™ In various embodiments, the number of players employed in the pool of available performers for each position includes at least the best perceived player from each team in the league (e.g., from thirty-two NFL™ teams, thirty NHL™ teams, thirty MLB™ teams and thirty NBA™ teams). In various embodiments, an external source 58 can provide updates to the games database 71 on a regular basis to account for any players who may have been injured, cut or otherwise rendered unavailable for play in real-world events. In this way, the database 71 remains accurate and the system avoids potentially populating a user's ticket with a player who is unable to play and earn points. In various embodiments, the pool of replacement performers is stored in database 73 and is initially populated with various performers who are deemed to be the first "backup" to the performers in the available performers database 72.

In operation, a user may be presented with a game selection display from which to choose a sport in which to wager on for a wagering game associated with the present invention. The selection display may be presented, for example, on a display of the user's computing device 33, on a display of a self-service operated kiosk vending device 35, or on a display of a retailer-operated vending device 35, wherein the user selects the game by communicating with a sales clerk operating the device 35, for example. In response to a user selecting a specific game, such as a football fantasy game, for example, the host 49 operates a randomizer engine to randomly select a subset of real-life performers from the pool of available real-life performers corresponding to the selected game. The subset can comprise one player per position. For example, for a football-themed game, one player is randomly chosen from the thirty-two quarterbacks, one player is randomly chosen from the thirty-two wide receivers, one player is randomly chosen from the thirty-two running backs, one player is randomly chosen from the thirty-two tight ends, and one player is randomly chosen from the thirty-two kickers. It will be appreciated that the system can operate such that the plurality of performers randomly selected in response to the user's request include at least two performers having different player positions within the same sport. It will also be appreciated that the element of time is involved in operating the system, as one player's performance will generally change in real life on a game-by-game basis. A time of entry reference is also determined by the host according to the date and time when the ticket was purchased and/or issued, and this reference is communicated along with the randomly selected players to the vending device 35 and/or user device 33 for reference on the issued ticket.

As described elsewhere herein, the user can be issued a ticket by having a physical ticket printed by or through use of the vending device 35 and/or user device 33. Alternatively, a virtual ticket can be displayed on such devices 35, 33 and optionally printed thereafter as desired by the user. The ticket can be obtained at a retail location, through a website, through a mobile application, in a team store, and other physical and virtual locations. The issued ticket displays the randomly selected performers and the time of entry reference. As noted above, the issued ticket can include an external event date reference, which indicates when the external events will be played that will determine the outcome of the ticket game. When the external, real-world events transpire associated with the game, such as the games held as of the external event date, a determination can be made by the host as to whether the user has won based on accumulated fantasy score formulations for the performers in the subset issued on the ticket. For instance, a football-themed ticket may include five performers, wherein the quarterback earned four points, the running back earned twenty-three points, the wide receiver earned nine points, the tight end earned seven points, and the kicker earned ten points. In this example, the total ticket points would be fifty-three points. Winnings can be awarded in a number of ways. For example, winnings can be awarded based on any individual performer at a given position having the highest total from among all other performers for the given position in the set of performers in the game database 71. Thus, for example, if the twenty-three points for the running back exceeded the individual points earned by any other individual running back, the ticket may be a winner. As another example, winnings can be awarded based on the total points earned for each ticket. As another example, winnings can be awarded based on the number of players on the ticket who earned the most points for their position for the given time frame, or who earned somewhere in the top five players for their position for the given time frame. In a football-themed game, the given time reference may be weekly National Football League™ games. In a baseball-, basketball-, or hockey-themed game, the given time reference may be for daily real-world games.

In various embodiments, the odds of winning vary based on the number of teams in each draw, and prize payouts are handled on a pari-mutuel basis. Fixed prizes can also be provided in various other embodiments. In various other embodiments, additional prizes can be awarded over the course of a longer time period, such as the running back with the most points over the course of a football season involving multiple games, for example. Actual outcomes of real-world events (e.g., player performances in football games) determine point totals for each ticket, and these outcomes can be measured by an external, certified statistical authority as described elsewhere herein.

Figure 6:
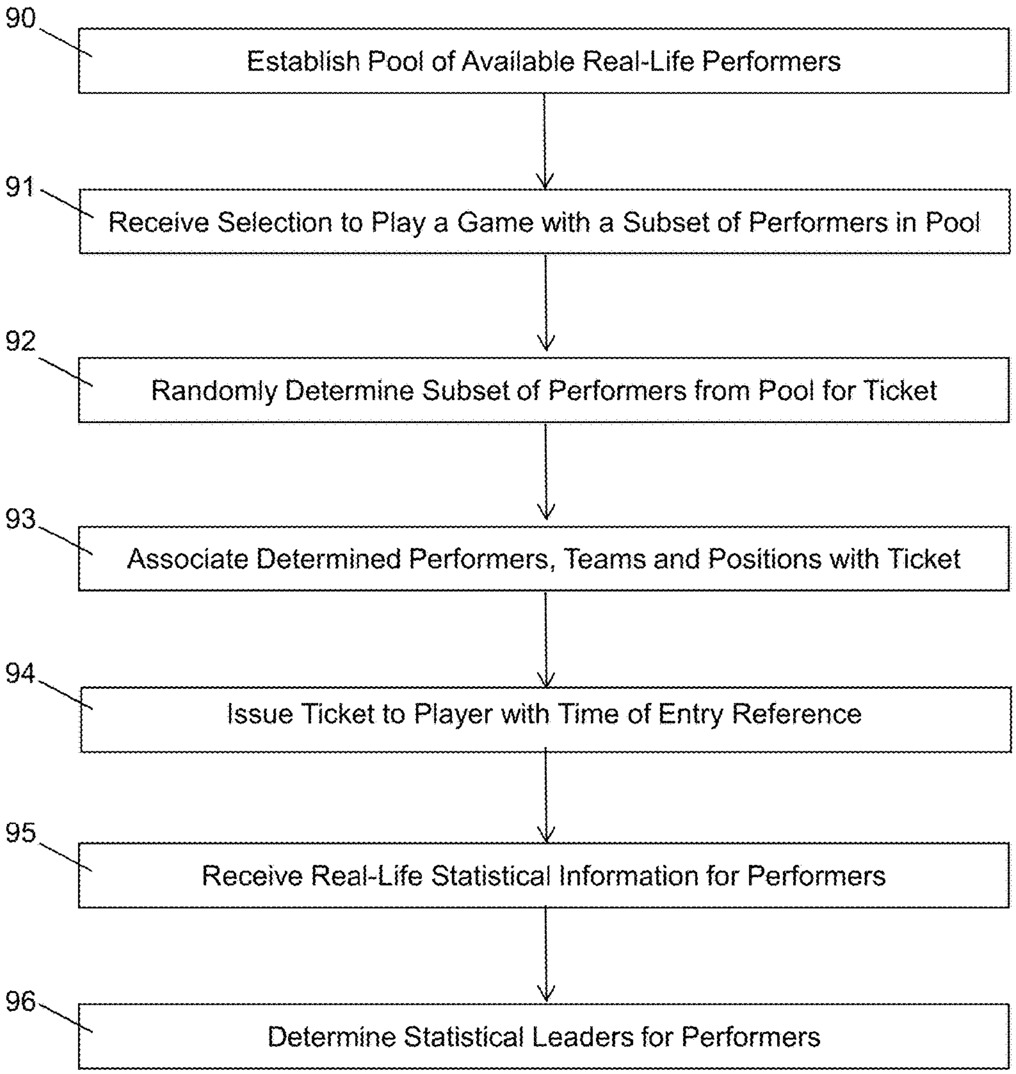
FIGS. 6 and 7 are flowcharts illustrating example methods of operating embodiments of the game system of the present disclosure.
Figure 7:
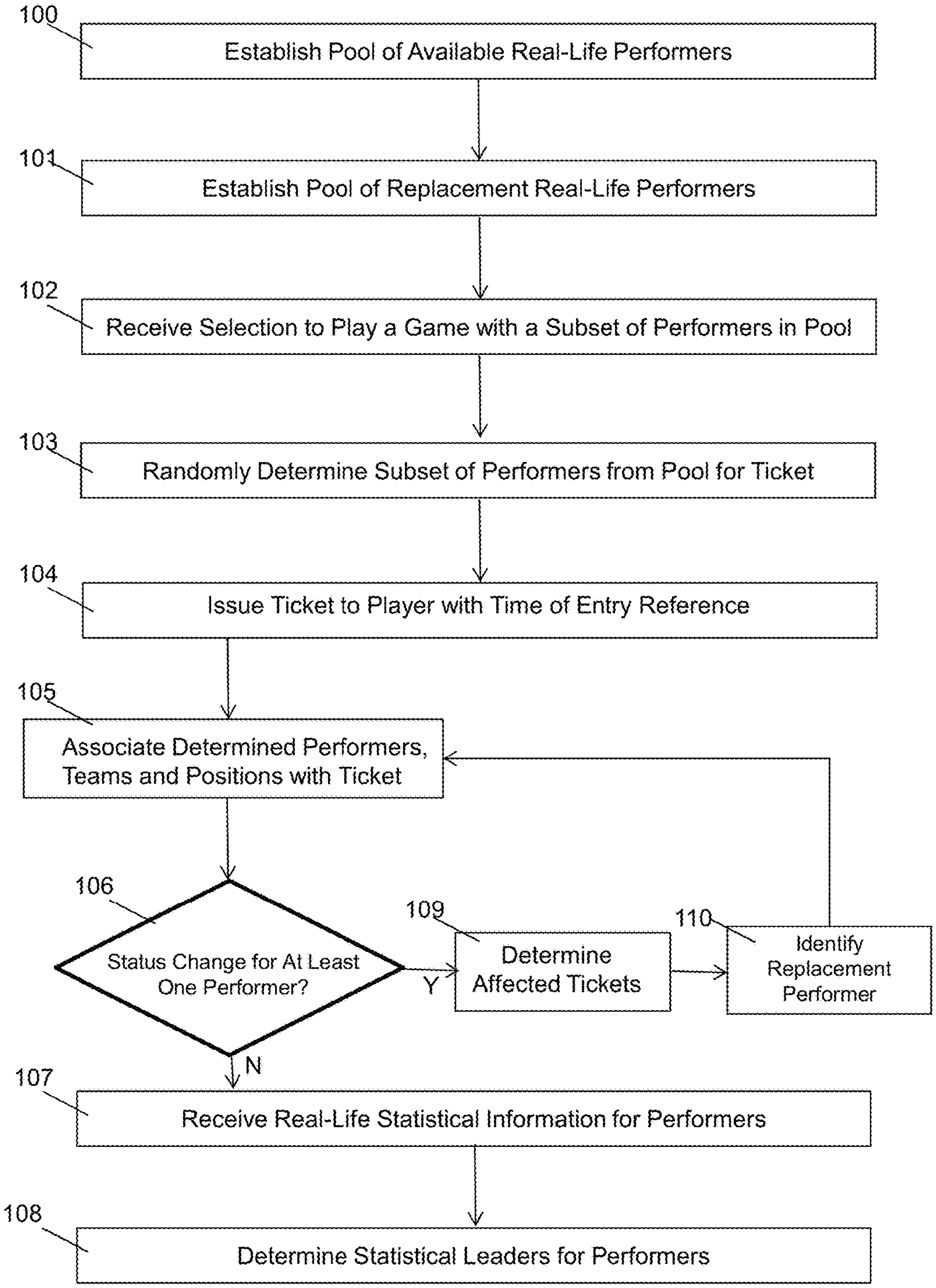

According to various embodiments, methods associated with the present disclosure can operate as illustrated in FIGS. 6 and 7. As shown in FIG. 6, an exemplary method can first establish a pool of available real-life performers, as at step 90. This pool can include one or more pools divided into subsets based upon sport or underlying external event. For instance, there can be a baseball pool, a football pool, etc. The pool includes identification information for real-life performers, including name, position and team, for example, as described above. As at step 91, the host can receive a selection from a gaming device to play a game with a subset of the performers in the pool. For example, a user can select a football game on a gaming device, whereupon the football subset includes all of the available real-life football players in the pool for the game, and wherein the user wishes to receive a subset of performers from the football pool for the user's ticket as described elsewhere herein. As at step 92, the host can randomly determine the subset of performers (in football, in this example), for inclusion as game play information on the user's ticket. As at step 93, the host further associates the determined performers and their respective identification information with the user's ticket in a database of purchased tickets. The host can further associate a time of entry reference corresponding to the time/date of the user's ticket purchase with the stored information in the database of purchased tickets. As at step 94, the requested ticket is issued to the user with the determined selections and time of entry reference. The ticket issuance can be in the form of a physical ticket or a virtual ticket as described elsewhere herein. As at step 95, the host then receives statistical information pertaining to the actual performances of the performers in the pool, including the statistical information associated with the performers identified on the issued ticket, as described elsewhere herein. As at step 96, the host further determines statistical leaders for the performers in evaluating whether the ticket is a winner. As described elsewhere herein, such determination can be, for example, for each performer associated with each ticket, an assessment of whether the fantasy score total for such performer exceeds the fantasy score total for all performers of the same position in the database.

As shown in FIG. 7, another exemplary method can first establish a pool of available real-life performers, as at step 100, and can further establish a pool of replacement performers, as at step 101. As described elsewhere herein, the pool of replacement performers can include the anticipated backup players for each of the players in the pool of available real-life performers. Thus, in the NFL™ game example, if there are thirty-two NFL teams, there may be thirty-two starting quarterbacks in the pool of available real-life performers, and thirty-two backup quarterbacks in the pool of replacement performers. As at step 102, the host can receive a selection from a gaming device to play a game with a subset of the performers in the pool, such as described in connection with FIG. 6 and elsewhere herein. As at step 103, the host can randomly determine the subset of performers, and can further determine the time/date of the user's ticket purchase for use as a time of entry reference for the ticket game. As at step 104, the requested ticket is issued to the user with the determined selections and time of entry reference. As at step 105, the host further associates the determined performers and their respective identification information with the user's ticket in a database of purchased tickets. The host can further associate the time of entry reference with the stored information in the database of purchased tickets. As at step 106, the host 49 can then determine whether a status change has occurred for one or more of the performers, such as by receiving official announcement from an external source, such as the sports league or sports information services. If no status changes have occurred as of the date the games involving the performers are to be played, then as at step 107, the host receives statistical information pertaining to the actual performances of the performers in the pool, including the statistical information associated with the performers identified on the issued ticket, and as at step 108, the host further determines statistical leaders for the performers in evaluating whether the ticket is a winner, as described elsewhere herein. On the other hand, if one or more status changes are received, the host determines any affected tickets as at step 109, identifies a replacement performer as at step 110, and then associates the identified replacement performer with the ticket as at step 105. The status change determination cycle continues until the external event date arrives, at which time the game is conducted and statistical determinations are made, as exemplified by steps 107 and 108. Thus, the originally issued ticket and any subsequently issued ticket has game play information that is modifiable after issuance of the original ticket. In various embodiments as described elsewhere herein, upon a replacement performer being substituted for one of the originally determined available performers, a replacement ticket may optionally be issued to the user.

The host 49 may be responsible to provide redemption information, prize information, and other information to the gaming devices. Optionally, the gaming devices, host, and tickets are designed with verification, validation, and/or anti-cheating mechanisms to ensure game integrity. In the embodiments with a computer readable code (e.g., barcode 38 and/or human readable code 39) on the ticket, this code may be used to validate the ticket, or for a machine to read the contents of the ticket. The example embodiment may also include security and/or anti-tampering technologies. The host 49 may be configured, responsive to the tender of a ticket in the first, second or fourth subsets identified above for redemption at a terminal, to transmit an indication to the terminal that the ticket should be redeemed for a prize.

It will be appreciated that tickets according to the present disclosure can include instructions on how to play the game printed thereon. These instructions include information indicating how to determine what prize, if any, the example ticket qualifies for. The ticket also may include information that indicates the cost of the ticket, the name of the game, and prizes available in the game, for example.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical.

Additionally, some steps can be performed simultaneously or substantially simultaneously despite being described or implied as occurring non-simultaneously.

Furthermore, aspects of the present disclosure may take the form of a computer program product embodied in one or more computer readable media having computer readable program code embodied thereon.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. A system host, comprising:

at least one processor and at least one memory device which stores a plurality of instructions, which when executed by the at least one processor, cause the at least one processor to:

establish a pool of available real-life performers, wherein the pool of available real-life performers comprises identification information for each of a plurality of available real-life performers, wherein the identification information comprises at least a performer name and a performer position, wherein the performer position for each of the plurality of available real-life performers comprises one of a plurality of available performer positions;

receive, from a gaming device, a user selection to play a sports fantasy wagering game;

in response to receiving the user selection, randomly select a plurality of real-life performers corresponding to the user selection from the pool of available real-life performers, wherein the randomly selected plurality of real-life performers comprises at least the identification information for a first performer associated with a first performer position and the identification information for at least one additional performer associated with an additional performer position that is different from the first performer position;

issue a user ticket to the gaming device, wherein the user ticket comprises game play information comprising the randomly selected plurality of real-life performers and a time of entry reference;

receive real-life statistical performance information associated with the performance of the available real-life performers in one or more games played after the time of entry reference on the user ticket;

determine a fantasy performance score for each of the plurality of available real-life performers in the pool of available real-life performers based upon the received real-life statistical performance information;

determine whether the determined fantasy performance score for the first performer on the user ticket exceeds the determined fantasy performance score of all of the plurality of available real-life performers comprising the performer position that is the same as the first performer position; and determine whether the determined fantasy performance score for the at least one additional performer on the user ticket exceeds the determined fantasy performance score of all of the plurality of available real-life performers comprising the performer position that is the same as the additional performer position.

2. The system host of claim 1, wherein the plurality of instructions further cause the at least one processor to associate the user ticket with the game play information in a database of purchased tickets.

3. The system host of claim 2, wherein the plurality of instructions further cause the at least one processor to receive a status update pertaining to at least the first performer, wherein the status update designates at least the first performer as being unavailable to participate in one of the one or more games.

4. The system host of claim 3, wherein the plurality of instructions further cause the at least one processor to:

establish a pool of replacement performers, wherein the pool of replacement performers comprises identification information for each of a plurality of replacement real-life performers, wherein the identification information for each of the plurality of replacement real-life performers comprises at least a replacement performer name and a replacement performer position, wherein the replacement performer position for each of the plurality of replacement real-life performers comprises one of the plurality of available performer positions; and in response to receiving the status update, identify a replacement performer from the pool of replacement real-life performers, wherein the replacement performer position of the identified replacement performer is the same as the first performer position.

5. The system host of claim 4, wherein the identification information for each of the plurality of available real-life performers and the identification information for each of the plurality of replacement real-life performers further comprises a team identifier, and wherein the team identifier associated with the first performer is the same as the team identifier associated with the identified replacement performer.

6. The system host of claim 4, wherein the plurality of instructions further cause the at least one processor to update the game play information associated with the user ticket in the purchased ticket database by replacing at least the first performer with the identified replacement performer.

7. The system host of claim 6, wherein the plurality of instructions further cause the at least one processor to issue a replacement user ticket comprising the updated game play information.

8. The system host of claim 7, wherein the replacement user ticket is a virtual ticket issued to the gaming device.

9. The system host of claim 3, wherein determining the fantasy performance score for each of the plurality of available real-life players is performed after a plurality of games.

10. A method, comprising:

causing at least one processor to establish a pool of available real-life performers, wherein the pool of available real-life performers comprises identification information for each of a plurality of available real-life performers, wherein the identification information comprises at least a performer name and a performer position, wherein the performer position for each of the plurality of available real-life performers comprises one of a plurality of available performer positions;

causing the at least one processor to receive, from a gaming device, a user selection to play a sports fantasy wagering game;

causing the at least one processor to, in response to receiving the user selection, randomly select a plurality of real-life performers corresponding to the user selection from the database of available real-life performers, wherein the randomly selected plurality of real-life performers comprises at least the identification information for a first performer associated with a first performer position and the identification information for at least one additional performer associated with an additional performer position that is different from the first performer position; and causing the at least one processor to issue a sports fantasy wagering game ticket to the gaming device, wherein the sports fantasy wagering game ticket comprises game play information comprising the randomly selected plurality of real-life performers and a time of entry reference, and wherein the game play information is modifiable after the time of entry reference.

11. The method of claim 10, further comprising:

causing the at least one processor to associate the user ticket with the game play information in a database of purchased tickets; and causing the at least one processor to receive a status update pertaining to at least the first performer, wherein the status update designates at least the first performer as being unavailable to participate in one or more games played after the time of entry reference on the sports fantasy wagering game ticket.

12. The method of claim 11, further comprising:

causing the at least one processor to:

establish a pool of replacement performers, wherein the pool of replacement performers comprises identification information for each of a plurality of replacement real-life performers, wherein the identification information for each of the plurality of replacement real-life performers comprises at least a replacement performer name and a replacement performer position, wherein the replacement performer position for each of the plurality of replacement real-life performers comprises one of the plurality of available performer positions; and in response to receiving the status update, identify a replacement performer from a pool of replacement real-life performers, wherein the replacement performer position of the identified replacement performer is the same as the first performer position.

13. The method of claim 12, wherein the identification information for each of the plurality of available real-life performers and the identification information for each of the plurality of replacement real-life performers further comprises a team identifier, and wherein the team identifier associated with the first performer is the same as the team identifier associated with the identified replacement performer.

14. The method of claim 12, further comprising:

causing the at least one processor to update the game play information associated with the user ticket in the purchased ticket database by replacing at least the first performer with the identified replacement performer.

15. The method of claim 14, further comprising:

causing the at least one processor to issue a replacement sports fantasy wagering game ticket comprising the updated game play information to the gaming device.

16. A system host, comprising:

at least one processor and at least one memory device which stores a plurality of instructions, which when executed by the at least one processor, cause the at least one processor to:

establish a pool of available real-life performers, wherein the pool of available real-life performers comprises identification information for each of a plurality of available real-life performers, wherein the identification information for each of the plurality of available real-life performers comprises at least a performer name and a performer position, wherein the performer position for each of the plurality of available real-life performers comprises one of a plurality of available performer positions;

establish a pool of replacement real-life performers, wherein the pool of replacement real-life performers comprises identification information for each of a plurality of replacement real-life performers, wherein the identification information for each of the plurality of replacement real-life performers comprises at least a replacement performer name and a replacement performer position, wherein the replacement performer position for each of the plurality of replacement real-life performers comprises one of the plurality of available performer positions;

issue a plurality of user tickets, wherein each of the plurality of user tickets comprises respective game play information comprising a respective plurality of real-life performers randomly selected from the pool of available real-life performers, wherein the respective game play information comprises the identification information associated with the respective plurality of randomly selected real-life performers;

associate each of the plurality of user tickets with the respective game play information and a respective time of entry reference for each of the plurality of user tickets in a database of purchased tickets;

identify an external event date associated with one or more real-life games to be played by at least a subset of the plurality of real-life performers in the pool after the time of entry reference on the plurality of user tickets;

determine, prior to the external event date, whether any of the game play information of each of the plurality of user tickets comprises at least one performer who is unavailable to participate in the identified one or more real-life games; and for each of the plurality of user tickets comprising at least one performer who is determined to be unavailable to participate in the identified one or more real-life games, select a specific replacement real-life performer from the database of replacement real-life performers;

update the game play information associated with each of the plurality of user tickets comprising at least one performer who is determined to be unavailable to participate in the identified one or more real-life games, wherein the update comprises replacing the at least one performer who is unavailable to participate with the selected replacement real-life performer, and storing the update in the database of purchased tickets;

receive, on or after the external event date, real-life statistical performance information associated with the performance of the plurality of available real-life performers and the selected specific replacement real-life performer in the identified one or more real-life games;

determine a fantasy performance score for the selected specific replacement real-life performer based upon the received real-life statistical performance information; and determine whether the determined fantasy performance score for the selected specific replacement real-life performer exceeds the determined fantasy performance score of the available real-life performers comprising the performer position that is the same as the replacement performer position for the selected replacement real-life performer.

17. The system host of claim 16, wherein the instructions further cause the at least one processor to:

determine a fantasy performance score for each of the plurality of available real-life performers in the database of available real-life performers based upon the received real-life statistical performance information; and determine whether the determined fantasy performance score for a first one of the plurality of real-life performers on each user ticket as stored in the purchased ticket database exceeds the determined fantasy performance score of the available real-life performers having a comprising the performer position that is the same as the performer position for the first one of the plurality of real-life performers.

18. The system host of claim 16, wherein the plurality of issued user tickets are physical tickets.

19. The system host of claim 16, wherein the plurality of issued user tickets are virtual tickets, and wherein the instructions further cause the at least one processor to issue a replacement user ticket for any issued user ticket with updated game play information.

20. The system host of claim 16, wherein the identification information for each of the plurality of available real-life performers and the identification information for each of the plurality of replacement real-life performers further comprises a team identifier, and wherein the team identifier associated with the at least one performer who is determined to be unavailable to participate in the identified one or more real-life games is the same as the team identifier associated with the selected specific replacement performer.

* * * * *